United States Patent Office 3,549,340
Patented Dec. 22, 1970

3,549,340
FUEL COMPOSITIONS AND ADDITIVES
Lester E. Coleman, Cleveland, Ohio, assignor to The Lubrizol Corporation, Wickliffe, Ohio, a corporation of Ohio
No Drawing. Filed Dec. 19, 1967, Ser. No. 691,698
Int. Cl. C10l 1/24
U.S. Cl. 44—63    11 Claims

ABSTRACT OF THE DISCLOSURE

Fuel compositions for internal combustion engines containing Diels-Alder adducts of N - 3 - oxohydrocarbon acrylamides and N-3-hydroxyhydrocarbon acrylamides or derivatives thereof and conjugated diene compounds such as 1,3-butadiene, cyclopentadiene. The adducts also have utility as solubilizing agents, plasticizers, and ultraviolet absorbing additives for polymeric compositions.

---

This invention relates to fuel compositions comprising novel additives and to the novel additives themselves. Specifically, this invention is directed especially to normally liquid petroleum distillate fuel compositions, particularly diesel fuel compositions, and to novel compositions of matter useful as additives for such compositions and as intermediates in the preparation of other useful products.

As is well-known, the exhaust products of internal combustion engines are characterized by various degrees of unpleasant, obnoxious, irritating odors. These characteristics are particularly noticeable in the exhaust of diesel engines. With the increasing number of diesel-powered buses, trucks, and other vehicles in operation, especially in congested urban traffic, it is becoming even more desirable to find means for alleviating these objectionable characteristics associated with the exhaust from internal combustion engines.

The present invention provides novel compositions of matter which, when incorporated into normally liquid fuels, diminish the unpleasant odor and irritating qualities of the exhaust emanating from engines upon combustion of the fuels without any significant adverse effects on the combustion characteristics of these fuels. These novel additives and fuel compositions containing them are discussed in greater detail hereinbelow.

In accordance with the foregoing, it is a principal object of the present invention to provide novel compositions of matter.

Another object is to provide novel compositions of matter useful as additives in normally liquid fuels, particularly liquid fuels used in internal combustion engines.

A further object is to provide novel compositions of matter useful as intermediates in the preparation of additional useful products.

A still further object is to provide novel fuel compositions.

An additional object is to provide novel diesel fuel compositions.

The manner in which these and other objects are achieved according to the present invention is to provide novel compositions produced by reacting under Diels-Alder reaction conditions a diene and a dienophile of the formula $$R_1-R_0-\underset{\underset{R_3}{|}}{\overset{\overset{R_2}{|}}{C}}-\underset{\underset{R_5}{|}}{\overset{\overset{R_4}{|}}{C}}-NH-\overset{\overset{O}{\|}}{C}-\underset{R_6}{C}=CH_2 \quad \text{Formula I}$$

where $R_1$ to $R_5$ are each individually hydrogen or hydrocarbyl radicals, $R_6$ is hydrogen or lower alkyl, and $R_0$ is $$-\overset{\overset{OH}{|}}{C}H-\ \text{or}\ -\overset{\overset{O}{\|}}{C}-$$

The resulting reaction products can then be incorporated into a fuel composition in minor but effective amounts to suppress exhaust odors, etc.

The Diels-Alder reaction or "diene synthesis" as it is sometimes denominated is a very well-known chemical reaction used extensively in organic syntheses. Frequent mention and/or use of the reaction is found in prior literature and patents, e.g., 1,891,043; 2,072,867; 2,262,002; 2,264,354; 2,357,910; 2,391,226; 2,450,765; 2,467,926; 2,493,964; 2,781,393; 3,287,395. A summary of the prior art relating to the diene synthesis is found in the Russian monograph, Dienovyi Sintex, Izdatel' stzo Akademii Nauk SSR, 1963, by A. S. Onischenko. (Translated into the English language by L. Mandel as A. S. Onischenko, Diene Synthesis, N.Y., Daniel Davey and Co., Inc., 1964.) To avoid useless repetition of what is well-known in the art, this monograph and reference cited therein are incorporated by reference into the present specification.

Basically, the Diels-Alder reaction involves contacting, under Diels-Alder conditions, a conjugated diene, $$\underset{/}{\overset{\backslash}{C}}=\overset{|}{C}-\overset{|}{C}-C\overset{/}{\underset{\backslash}{}}$$

with ethylenically unsaturated compounds, $$\underset{/}{\overset{\backslash}{C}}=C\overset{/}{\underset{\backslash}{}}$$

these latter being known as dienophiles. This reaction typically proceeds through an addition reaction forming 1:1 adducts, i.e., one dienyl group and one dienophile combining as indicated below to form a cyclic adduct:

$$\underset{/}{\overset{\backslash}{C}}=\overset{|}{C}-\overset{|}{C}=C\overset{/}{\underset{\backslash}{}} + \underset{/}{\overset{\backslash}{C}}=C\overset{/}{\underset{\backslash}{}} \longrightarrow \text{(A)}$$

The adduct (A) is commonly referred to as a Diels-Alder adduct.

As used in the instant specification and claims, the term "diene" is intended to refer to the well-known class of compounds characterized by the conjugated dienyl group, $$\underset{/}{\overset{\backslash}{C}}=\overset{|}{C}-\overset{|}{C}=C\overset{/}{\underset{\backslash}{}}$$

which combine with dienophiles to form Diels-Alder adducts. The dienes contemplated as reactants in the present invention can be aliphatic alicyclic, aromatic, or heterocyclic. As is apparent to those skilled in the art, the diene can contain more than two unsaturated groupings, $$\left(\text{e.g.,}\ \underset{/}{\overset{\backslash}{C}}=C\overset{/}{\underset{\backslash}{}}\right)$$

as long as at least two are in the so-called conjugated relationship. Thus, butadiene, 1-allylcyclopentadiene, and cyclooctatriene are suitable diene reactants.

Illustrative aromatic dienes include those aromatic compounds containing at least ten nuclear carbon atoms (i.e., condensed aromatic compounds) in the nuclei thereof.

Naphthalene;
1,2,3,4-tetramethylnaphthalene;
2,3-diethylnaphthalene;
1,2-dimethylnaphthalene;
anthracene;
2-isopropenylanthracene;
9,10-dimethylanthracene;
9-phenylanthracene;
1,2-benzanthracene;

3-methylcholanthracene;
9-anthracenecarboxylic acid;
9-formylanthracene;
1,5-dichloro-9-acetoxyanthracene;
9-nitroanthracene;
9-bromoanthracene;
tetracene (or naphthacene);
pentacene and the like, are examples of suitable aromatic dienes.

Suitable heterocyclic dienes are furan; 2,5-dimethylfuran; 2-ethylfuran; 2-(β-phenylethyl)furan; 2-(β-m-methoxy-phenylethyl)furan; furfuryl acetate; furfuryl alcohol; furfuryl methyl ether; 2-acetoxyfuran; 2-(β-carboxyethyl)-furan; 3-bromofuran; 1,3-diphenylisobenzofuran; a-pyrone; 5-methyl- or 5-ethyl-a-pyrone; 1-methylisoindole; oxazoles such as 2,5-dimethyloxazole; and the like.

Alicyclic dienes useful in the present invention include 1,3-cyclopentadiene and 1,3-cyclopentadienes substituted with halo, lower alkyl, lower alkoxy, carboxy, amino, etc., such as 1,5,5- and 1,3,4-trimethylcyclopentadiene, cyclopentadiene carboxylic acid, methyl ester of cyclopentadienecarboxylic acid, spiroheptadiene, isoclicyclopentadiene, hexachlorocyclopentadiene, 6,6-dimethylfulvene, 6,6-diphenylfulvene, etc. Other suitable cyclic dienes are cyclohexadiene-1,3; 1-formylcyclohexadiene-1,3; 1-acotoxy-hexadiene-1,3; 1,3-dichlorocyclohexadiene-1,3; cycloheptadiene-1,3; cycloheptatriene-1,3,5; cyclooctatriene-1,3,5; etc.

However, for reasons of economy, availability, and the like, with the exception of the 1,3-cyclopentadienes and, perhaps the furans, the aromatic, heterocyclic, and alicyclic dienes are as desirable diene intermediates as are the preferred dienes, the aliphatic dienes.

The aliphatic dienes useful in preparing the adducts of this invention characterized by at least one conjugated dienyl grouping,

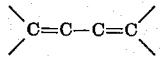

Included within this class of compounds are butadiene-1,3; trans-hexatriene-1,3,5; heptatriene-1,3,5; octatriene-1,3,5; octatriene-2,4,6; 2,5-dimethylhexatriene-1,3,5; 2,6-dimethyloctatriene-2,4,6; pentatriene-1,2,4; and the like.

The preferred alidiene diene reactant is butadiene-1,3 or one of the well-known classes of dienes which can be regarded as substituted butadiene-1,3. These dienes can be represented by the following general formula.

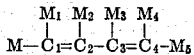

Formula II where M through $M_5$ are each individually hydrogen or a monovalent radical selected from the group consisting of halo, (e.g., I, Br, Cl, or F), nitro, cyano, carboxy, $-NZ_1Z_2$,

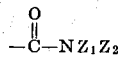

formyl, formyloxy, hydroxy, mercapto, hydrocarbyl, or hydrocarboyl—X—, with the proviso that the hydrocarbyl and hydrocarbyl—X— groups may themselves be substituted by one or more, but preferably not more than two, of these monovalent radicals. The variable X is a divalent radical selected from the group consisting of

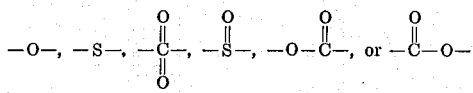

$Z_1$ and $Z_2$ are each individually hydrogen, hydrocarbyl or, together with the nitrogen to which they are attached, form a five- or six-membered heterocyclic ring.

The term "hydrocarbyl" as used in the specification and claims is intended to encompass the monovalent radical of an aliphatic, cycloaliphatic, aromatic, arylaliphatic, aliphaticaryl, arylcycloaliphatic, cycloaliphatic-alkylaryl, cycloaliphaticaryl, and cycloaliphaticalkyl hydrocarbon, and the like, of up to about twenty atoms and usually ten carbon atoms or less. Hydrocarbyl radicals are illustrated by:

(1) Alkyl: Methyl, ethyl, propyl, isopropyl, butyl, tertiary butyl, heptyl, nonyl, decyl, octadecyl, etc.

(2) Alkenyl: Ethenyl, allyl, 1-butenyl, isobutenyl, 2-pentenyl, 3,4-dimethyl-2-hexenyl, 1-octenyl, 1-decenyl, etc.

(3) Cycloalkyl: Cyclopentyl, cyclohexyl, cyclooctyl, alkylcycloalkyl such as 2,3-dibutylcyclohexyl, cycloalkylcycloalkyl such as 3-cyclohexylcyclohexyl, etc. (preferably, the number of carbons in the nucleus of the cycloalkyl groups is five or six, any additional carbons in these groups being derived from hydrocarbon containing substituents attached thereto, the total number of carbons being up to about twenty.)

(4) Cycloalkenyl: Cyclopentenes, cyclohexenes, cycloheptenes, etc., corresponding to the above class of cycloalkyl groups but containing at least one ethylenic linkage in the nucleus thereof.

(5) Aryl: Phenyl, napthyl, alkylaryl such as decylphenyl and tolyl, 3-propylnaphthyl, alkenylaryl such as p-allyl-phenyl, cycloalkyl aryl such as 3-cyclohexylphenyl, etc., with pheny and substituted phenyl being the preferred aryl hydrocarbyl groups.

It is clear that there are many obvious variations of these hydrocarbyl groups which are clearly equivalent and fall within the scope of the present invention. Thus, other representative hydrocarbyl groups are arylalkyl such as benzyl and phenethyl, alkylarylalkyl such as tolylpropyl, cycloalkylalkyl such as cyclohexylmethyl, and the like.

As explained above, hydrocarbyl and hydrocarbyl—X— substituents may be substituted. Examples of these substituted hydrocarbyl groups are as follows: Aminoethyl, dimethyl aminobutyl, ethoxyethyl, β-mercaptoethyl, 1,5-dichloropentyl, 3-ethylmercaptocyclohexyl, 8-nitrodecyl, 4-formylbutyl, 3-hydroxypropyl, p-aminophenyl, m-propylaminophenyl, p-ethoxybenzyl, 2-methylcycloheptyl, 1-nitro-3-hydroxybutyl, β-cyclohexyloxyethyl, 2-bromopropyl, 3-trifluoromethylpropyl, trifluoromethyl, 3-cyanobutyl, α - chloroacetyloxy, 3 - carbamylpropoxy, 4-chlorobutoxycarbonyl, 3-aminopropionyloxy, 2-iodobutylsulfonyl, 4-methoxycyclohexylsulfonyl, β-diethylaminoethylsulfonyl, and the like.

Representative of the preferred five to six membered heterocyclic radicals contemplated by this invention as represented by the group $-NZ_1Z_2$ are pyrrolyl, pyrrolidinyl, pyrrolinyl, chromanyl, pyranyl, isochromanyl, thienyl, imidazolidinoyl, imidazolinyl, pyrazolidinyl, pyrazolinyl, piperidyl, piperazinyl, morpholinyl, thiomorpholinyl, and the like. Also included within this group of heterocyclic radicals are the corresponding substituted heterocyclic radicals containing from one to three substituents selected from the class consisting of lower alkyl, lower alkoxy, halo, hydroxy, mercapto, lower alkylmercapto, nitro, amino, and lower alkyl amino. [The adjective "lower" as employed in conjunction with a carbon-containing radical in the specification and claims is intended to limit the carbon content of the radical to a maximum of seven carbons. Thus "lower alkyl" includes methyl, ethyl, butyl tertiary butyl, isoamyl, heptyl, etc.]

Generally, not more than three of the M variables, preferably not more than one or two, are other than hydrogen. Moreover, when M through $M_5$ are other than hydrogen, they are, preferably, lower alkyl, halo, lower alkoxy, lower alkenyl, lower alkenyloxy, carboxy, cyano, amino, lower alkylamino, di-lower alkylamino, phenyl and phenyl substituted by one to three substituents corresponding to these M variables. Generally, the total number of carbon atoms in the aliphatic diene molecule will be from four to twenty. The most preferred aliphatic diene reactants are 1,3-butadiene, isoprene, piperylene, and chloroprene.

Specific aliphatic dienes useful in preparing the adducts of the invention are tabulated in Table I.

TABLE I.—DIENES

| M | M₁ | M₂ | M₃ | M₄ | M₅ |
|---|----|----|----|----|----|
| CH₃— | | | | | |
| Phenyl | | | | | |
| HOOC— | | | | | |
| N≡C— | | | | | |
| CH₃O— | | | | | |
| CH₃C(O)—O— | | | | | |
| (CH₃CH₂)₂N— | | | | | |
| CH₃CH₂O— | | | | | |
| HC₃CH₂O— | | | | | |
| NO₂— | | | | | |
| CH₃C(O)— | | | | | |
| H—C(O)— | | | | | |
| | | CH₃— | | | |
| | | Phenyl | | | |
| | | CH₃O— | | | |
| | | H—C(O)—O— | | | |
| | | Cl- | | | |
| CH₃(CH₂)₃— | | | | | |
| tert-Butyl | | | | | |
| | | i-Propyl | | | |
| | | tert-Butyl | | | |
| CH₃— | | CH₃— | | | |
| CH₃— | | Phenyl- | | | |
| CH₃— | | Cl | | | |
| CH₃CH₂— | | Cl | | | |
| Phenyl- | | CH₃CH₂— | | | |
| Do | | CH₃O—C(O)— | | | |
| Do | | Phenyl- | | | |
| CH₃— | CH₃— | CH₃— | | | |
| CH₃— | CH₃ | i-Propyl- | | | |
| Phenyl- | | | | CH₃— | |
| | | CH₃— | Phenyl— | | |
| | | Cl- | CH₃— | | |
| HOOC— | | | | HOOC— | |
| Phenyl- | | Phenyl- | | CH₃— | |
| Do | | | Phenyl- | | |
| | | | Phenyl- | Phenyl- | |
| Cl- | | | | Cl- | |
| Br | | CH₃— | | | |
| Cl- | | | CH₃— | | |
| CF₃— | | | CH₃— | | |
| CF₃— | | | | | |
| | CF₃— | | | | |
| | F- | | | | |
| | Br- | | | | |
| CH₃(CH₂)₃—O— | | | CH₃CH₂O— | | |
| CH₃(CH₂)₅ | | | | HOOC—(CH₂)₇— | |
| CH₃CH₂CH₂O— | | | | | |
| CH₃CH₂— | CH₃CH₂— | | | | |
| p-Chlorophenyl | | | | | |
| Cyclohexoxy- | | | | | |
| | | F- | | | |
| Tolyl | | | | | |
| p-Fluorophenyl | | | | | |
| 3,4-dimethoxyphenyl | | | | | |
| 3,4-methylenedioxyphenyl | | | | | |

NOTE.—Unless otherwise indicated, the various M variables in this table are hydrogen.

The dienophiles correspond to Formula I above are an art-recognized class of N-3-oxohydrocarbon-substituted acrylamides and their 3-hydroxy analogs derived from the known 3-oxo compounds. This class of compounds as well as methods for preparing the compounds within the class are disclosed in U.S. Pats. 3,277,056 and 3,341,455. These patents are incorporated herein by reference for their disclosure of the dienophiles.

The compounds used as intermediates to make the hydroxy substituted dienophiles used as intermediates in the invention may be prepared by reacting an alcohol of the formula ROH with an N-3-oxohydrocarbon-substituted acrylamide of the formula

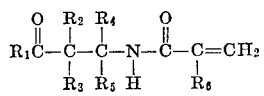

Formula III wherein R, R₁, R₂, R₃, R₄, R₅, and R₆ are as defined hereinabove, in the presence of a strongly alkaline catalyst. The reaction between the N-3-oxohydrocarbon-substituted acrylamide and the alcohol is usually carried out at about 50°–100° C., preferably about 50°–80° C. The use of an inert solvent, such as an ether or a polyether derived from ethyleneglycol or the like, is sometimes advantageous, but it is often preferred to carry out the reaction in an excess of the alcohol being used as a reactant. Product yields are increased when a large excess of the alcohol is used; i.e., a mole ratio of alcohol to N-3-oxohydrocarbon-substituted acrylamide of about 8:1 to 12:1 is preferred. A more detailed discussion for preparing these intermediates is found in copending application Ser. No. 682,493, filed Nov. 13, 1967, now abandoned.

The alkaline catalyst used in the reaction may be an alkali metal such as sodium or potassium; an alkali metal hydroxide such as sodium or potassium; an alkali metal hydroxide such as sodium or potassium hydroxide; an alkoxide such as sodium cyclohexoxide; an alkali metal hydride; or a quaternary ammonium hydroxide such as tetramethylammonium hydroxide. When an alcohol is used as the solvent, it is frequently convenient to react the alkali metal with the alcohol, prior to the addition of the N-3-oxohydrocarbon-substituted acrylamide, to form the corresponding alkoxide. The amount of alkaline catalyst required is generally no more than about 0.1–0.3 mole per mole of N-3-oxohydrocarbon-substituted acrylamide.

This reaction forms the intermediate compounds within 6–8 hours at about 50°–80° C. These intermediates, which may then be isolated by distillation, recrystallization or the like, conform to the following general formula.

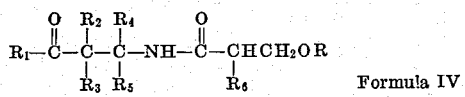

Formula IV wherein $R_1$–$R_6$ are as previously defined and R is the residue of the alcohol reactant and is preferably lower alkyl but may be aryl-lower alkyl, cyclo-lower alkyl, or cycloalkyl-lower alkyl.

Alcohols conforming to the formula ROH and suitable for preparing the intermediates are the lower alkanols, cycloalkyl-substituted lower alkanols, cycloalkanols, aryl-substituted lower alkanols, etc. Specific examples include methanol, ethanol, butanol, pentanol, cyclohexanol, cyclopentanol, benzyl alcohol, phenylethanol, and the like.

These intermediates are then hydrogenated and subsequently subjected to alkaline pyrolysis to prepare dienophiles of the formula

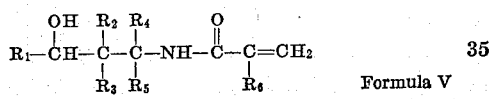

Formula V where $R_1$–$R_6$ are as previously defined.

The following illustrates a typical procedure for preparing the hydroxy-substituted dienophiles of Formula V. By substituting different intermediates of the type conforming to Formula III for the diacetone acrylamide of step (a), the analogous hydroxy-substituted dienophiles can be readily prepared.

(a) To a solution of 4070 parts (24 moles of N-(1,1-dimethyl-3-oxobutyl)acrylamide (diacetone acrylamide)) in about 6000 parts of methanol there is added a solution of sodium methoxide prepared from 54 parts (2.4 moles) of sodium in about 144 parts of methanol. (A total of 192 moles of methanol is used.) The resulting solution is heated under reflux for 6½ hours, and then 120 parts of sulfuric acid is added, followed by a few grams of acetic acid to neutralize the mixture. The methanolic solution is filtered and the methanol is removed by distillation under reduced pressure. There is obtained 4535.8 parts (94% of the theoretical amount) of N-(1,1-dimethyl-3-oxobutyl)-3-methoxypropionamide. The product is a clear liquid.

(b) A solution of 490 parts of N-(1,1-dimethyl-3-oxobutyl)-3-methoxypropionamide in 320 parts of methanol is purged with nitrogen, and 28.2 parts of Raney nickel is added. The mixture is pressurized with hydrogen in an autoclave at 1150 p.s.i. and heated to 49° C., and then to 72° C. over 45 minutes. After heating at 72° C. for an additional 3½ hours, with periodic restoration of the 1150 p.s.i. hydrogen pressure, the Raney nickel is removed by filtration and the methanol is stripped. There is obtained 475 grams of N-(1,1-dimethyl-3-hydroxybutyl)-3-methoxypropionamide.

(c) The product of (b) is allowed to drip onto sodium hydroxide pellets heated at 160°–170° C. in a glass tube which has been evacuated to a pressure of 30 mm. The system is maintained under nitrogen during the reaction. There is obtained a 98% yield of N-(1,1-dimethyl-3-hydroxybutyl)acrylamide.

As mentioned above, $R_1$ through $R_5$ are hydrogen, hydrocarbyl, or substituted hydrocarbyl. In the case of the substituted hydrocarbyl groups, the substituents enumerated in regard to the M variables of the diene are contemplated. These substituents should not be present in proportions sufficiently large to alter significantly the hydrocarbon character of the radical. The upper limit with respect to the proportion of such substituents is about 70 percent based on the weight of the hydrocarbon portion of the radical. Thus, the radicals may be, for example, methyl, ethyl, n-butyl, sec-butyl, n-decyl, cyclopentyl, cyclohexyl, phenyl, benzyl, tolyl, 2-chloro-1-butyl, p-nitrophenyl, o-chlorophenyl, and the like. Preferably, $R_1$–$R_5$ are hydrogen or hydrocarbyl of up to ten carbon atoms. Lower alkyl groups are the preferred hydrocarbyl groups.

The radical $R_6$ is preferably a hydrogen atom but may be a hydrocarbyl radical containing no more than 10 carbon atoms. If $R_6$ is other than hydrogen, it is preferably lower alkyl, especially methyl.

The following are examples of typical dienophiles suitable for preparing the adducts of this invention.

N-(1,1-dimethyl-3-oxobutyl)acrylamide

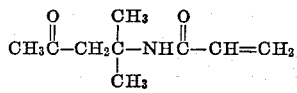

N-(1-methyl-3-oxopropyl)methacrylamide

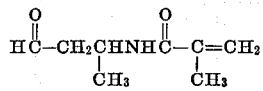

N-(1,3-diphenyl-1-methyl-3-oxopropyl)acrylamide

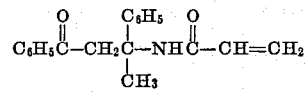

N-[1,3-di-(p-nitrophenyl)-1-methyl-3-oxopropyl] methacrylamide

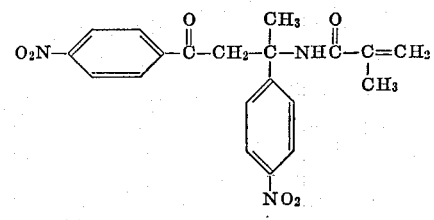

Other dienophiles are

N-3-oxopropylacrylamide,
N-3-oxobutyl-acrylamide,
N-(1-methyl-3-oxobutyl)acrylamide,
N-(1-methyl-1,3-dicyclohexyl-3-oxopropyl)acrylamide,
N-(1,2-dimethyl-1-ethyl-3-oxobutyl)acrylamide,
N-(1,5-dimethyl-1-isopropyl-3-oxohexyl)acrylamide,
N-(1,1-diisobutyl-2-isopropyl - 5 - methyl-3 - oxohexyl) acrylamide,
N-(1,1-dibutyl-2-n-propyl-3-oxoheptyl)acrylamide,
N-(1-methyl-3-oxobutyl)metacrylamide.

The preferred dienophile is N-(1,1-dimethyl-3-oxobutyl) acrylamide, also known as diacetone acrylamide.

The Diels-Alder reaction conditions are obviously well-known in the art. Generally, the diene and dienophile are brought into intimate contact for a period of up to about 144 hours, and at temperatures varying from about 0° C. to about 200° C. Normally, satisfactory reaction takes place at temperatures of 80°–180° C. for four to twenty-four hours. The optimum conditions for the preparation of Diels-Alder adduct from a specific diene and a specific dienophile is easily ascertained by routine trials. This determination can be greatly simplified by reference to the above-mentioned monograph which presents an execllent summary of the prior art process conditions and refers to particular references disclosing reaction conditions found suitable for an extremely diverse group of dienes.

The reaction may be facilitated by low initial temperatures (e.g., −30° C.) and/or super atmospheric pressure, particularly where the diene is volatile. Reflux conditions are normally employed to prevent the loss of reactants, product, and/or solvent through evaporation if the reaction is not conducted in a closed vessel. Moreover, the reaction can be, and usually is, conducted in the presence of an inert reaction medium such as water, the aromatic hydrocarbons (e.g., benzene, xylene, toluene), alcohols (e.g., ethyl alcohol, methyl alcohol and propyl alcohol) non aromatic hydrocarbons (e.g., heptane, pentane, cyclohexane), acetic acid, dioxane, chloroform, nitrobenzenes, chlorobenzenes, ethers (e.g., ethyl ether), pyridine, N,N-dimethyl formamide, N,N-dimethyl acetamide, ketones (e.g., acetone), and mixtures of two or more of these. In many instances, an excess of the diene reactant can serve as a diluent.

Since both reactants are ethylenically unsaturated, there is a possibility that they will undergo polymerization. In any situation where polymerization appears to be a problem in the process for making the adducts, it is readily overcome simply by incorporating one or more polymerization inhibitors such as hydroquinone, di-t-butyl-p-cresol, and t-butylcatechol into the reaction mixture.

The Diels-Alder adducts prepared from the aliphatic dienes can be represented by the general formula

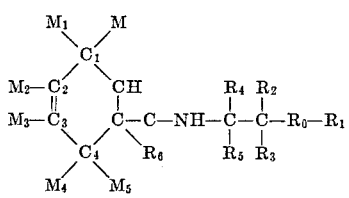

Formula VI where $M-M_5$ and $R_0-R_6$ are as previousely defined. Thus, when a given aliphatic diene is reacted with diacetone acrylamide, the Diels-Alder product is represented by the formulae

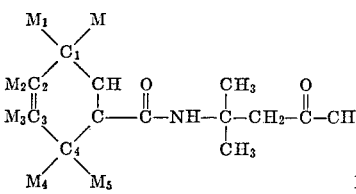

Formula VII

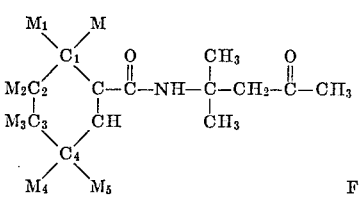

Formula VIII

It is obvious that when all the M's are the same (e.g., hydrogen) or when the diene is symmetrically substituted, (e.g., M and $M_5$ are both $CH_3$—) Formula VII and Formula VIII are the same. Otherwise, VII and VIII represent the two isomers which may be and usually are formed by the reaction. (For purposes of the present invention no separation of these isomers is required.) Formula VI is generic to both VII and VIII.

If the diene is cyclic, i.e.,

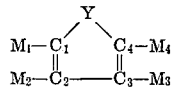

Formula IX where $M_1-M_4$ are as previously defined and Y is a divalent group such as —O—, hydrocarbylene of up to 4 carbon atoms, or a corresponding substituted hydrocarbylene—e.g., alkylene such as —$CH_2$—, —$CH_2$—$CH_2$; haloalkylene such as

then the adduct corresponds to the generic formula

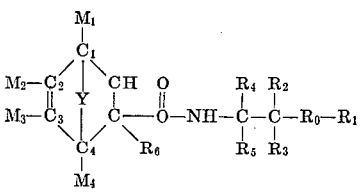

Formula X

Generally, cyclopentadiene and substituted cyclopentadienes will constitute the preferred cyclic dienyl reactant. These adducts can be represented by the formula

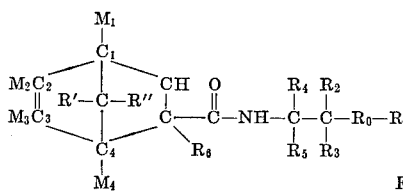

Formula XI where $M_1-M_4$ and $R_0-R_6$ are as defined hereinbefore and R′ and R″ are each individually hydrogen, halo, methyl, and the like depending on the substituent present on the carbon atom in the cyclopentadiene starting material.

The following examples illustrate the preparation of the Diels-Alder adducts of the invention.

EXAMPLE 1

A mixture comprising 676 grams (4 moles of diacetone acrylamide, 676 grams of benezene, 6.85 grams of hydroquinone (polymerization inhibitor) is added to 4300 ml. capacity autoclave and cooled to about 25° C. Liquid butadiene (238 grams; 4.4 moles; B.P., 4.4° C.) is added and the autoclave is sealed. Then the autoclave is allowed to warm to room temperature and then heated at about 145°–155° C. for 8.5 hours. After this heating, the autoclave is vented and the liquid contents thereof decanted. The decanted liquid is stripped at reduced pressure to remove the benzene and filtered. The filtrate, weighing 745 grams (82.5% yield) is the desired adduct and is characterized by a nitrogen content of 6.35% by weight.

Following the procedure of Example 1, the Diels-Alder adducts of the dienes and dienophiles presented in Table II are successfully prepared. Since the only reason for the low initial temperature used in Example 1 is to facilitate the handling and reduce the loss of the volatile butadiene, it is obvious that such low temperatures can be omitted when less volatile dienes are employed.

TABLE II

| Example No.: | Diene | Dienophile |
|---|---|---|
| 2 | Butadiene-1,3 | N-3-oxopropylacrylamide. |
| 3 | do | N-(1,2-dimethyl-1-ethyl-3-oxobutyl)acrylamide. |
| 4 | do | N-(1,1-dibutyl-2-n-propyl-3-oxoheptyl)acrylamide. |
| 5 | do | N-(1-methyl-3-oxobutyl)-methacrylamide. |
| 6 | do | N-(1-methyl-1,3-dicyclohexyl-3-oxobutyl)acrylamide. |
| 7 | do | N-(1,3-diphenyl-1-methyl-3-oxopropyl)acrylamide. |
| 8 | do | N-[1,3-di-(p-nitrophenyl)-1-methyl-3-oxopropyl]methacrylamide. |
| 9 | do | N-(1,5-dimethyl-1-isopropyl-3-oxohexyl)acrylamide. |
| 10 | do | N-(1,1-dimethyl-3-hydroxybutyl)acrylamide. |
| 11 | do | N-3-hydroxypropylacrylamide. |
| 12 | do | N-(1-methyl-3-hydroxybutyl)methacrylamide. |
| 13 | do | N-(1,5-dimethyl-1-isopropyl-3-hydroxyhexyl)acrylamide. |
| 14 | Isoprene | Diacetone acrylamide. |
| 15 | do | N-(1,1-dimethyl-3-hydroxybutyl)acrylamide. |

Obviously, by substituting an equivalent amount of other dienes (e.g., chloroprene; 1-carboethoxybutadiene-1,3; 1-diethylaminobutadiene-1,3, etc.) or other dienophiles according to Formula I for those of Examples 1–15, other adducts are readily prepared.

EXAMPLE 16

(a) To a reaction mixture comprising 132.2 grams (2 moles) of 1,3-cyclopentadiene, 172 grams of n-hexane, and 3.5 grams of hydroquinone in a glass reaction vessel fitted with reflux condenser and stirrer there is slowly added over a 40-minute period 338 grams (2 moles) of diacetone acrylamide. This mixture is allowed to stand for several hours and finally heated to about 150° C. for seven hours. The reaction mixture is then cooled, filtered, and stripped to remove the n-hexane. The resulting product is the desired Diels-Alder adduct.

(b) A reaction mixture comprising 16.9 grams (0.1 mole) of diacetone acrylamide and 27.3 grams (0.1 mole) of hexachlorocyclopentadiene-1,3 at room temperature is slowly heated to 100° C., maintained at 100° C. for 0.5 hr., cooled to room temperature, and extracted with four 100-ml. portions of textile spirits. The extract upon cooling yield crystals which were collected by filtration, recrystallized from textile spirits and again recrystallized from a methanol-water mixture to produce white crystals melting at 125°–128° C. Nitrogen content: 3.15% by weight; chlorine content: 48.0% by weight.

Following the procedure of (a) or (b), other adducts of diacetone acrylamide and other 1,3-cyclopentadiene derivatives corresponding to Formula IX can be prepared. For example, by substituting equimolar amounts of 1,3,4-trimethylcyclopentadiene-1,3 for the cyclopentadiene of (a) corresponding adducts are prepared. The adducts of other cyclic dienes such a cyclohexadiene-1,3 and its derivatives can be prepared by following these general procedures.

The polyhalogenated adducts (e.g., polychloro- or polybromo-) such as the adducts of hexachlorocyclopentadiene-1,3 and dienophiles corresponding to Formula I, especially where $R_1$–$R_6$ are hydrogen or lower alkyl (e.g., diacetone acrylamide), are characterized by pesticidal properties, especially insecticidal, bactericidal, and herbicidal properties. When used as insecticides, these adducts are dispersed or dissolved in suitable inert diluents and applied to the habitat of the insects to be destroyed. Usually, the concentration of adduct will be from about 0.1% to about 10% by weight of the solution or dispersion when used as an insecticide. These chloro-containing adducts are also useful as bactericides in fuels such as jet fuels, diesel fuels, etc. When employed in concentrations of about 0.05% to about 2% by weight.

EXAMPLE 17

Equimolar quantities (1 mole each) of 2,3-dimethylbutadiene-1,3 and diacetone acrylamide in 110 grams of xylene are refluxed at atmospheric pressure for 24 hours to prepare the desired adduct.

Following this procedure, adducts are prepared from the dienes and dienophiles presented in Table III.

TABLE III

| Example No. | Diene | Dienophile |
|---|---|---|
| 18 | 4-dimethylbutadiene-1,3 | Diacetone acrylamide. |
| 19 | 1,1,3-trimethylbutadiene-1,3 | Do. |
| 20 | trans-1-phenylbutadiene-1,3 | Do. |
| 21 | 1-o-nitrophenylbutadiene-1,3 | Do. |
| 22 | 2-fluorobutadiene-1,3 | Do. |
| 23 | 1-ethoxybutadiene-1,3 | Do. |
| 24 | 1-acetoxybutadiene-1,3 | Do. |
| 25 | 1-cyanobutadiene-1,3 | Do. |

By substituting other dienophiles corresponding to Formula I or Formula V above for diacetone acrylamide, the analogous adducts of the dienophiles of Table III are readily prepared.

When employed as exhaust-odor suppressant additives for liquid fuels, the Diels-Alder adducts of the invention are generally employed in amounts of from about 10–100 pounds per thousand barrels of fuel. Preferably, the concentration of adduct per thousand barrels of fuel is 25–50 pounds.

The effectiveness of the Diels-Alder adducts as odor suppressants is typified by the following test results. In these tests, the exhaust gases are rated as to the intensity (0=no odor; 5=very strong odor) and irritating characteristics (0=pleasant odor; 5=very objectional odor). A commercial diesel fuel, evaluated with and without the adduct of Example 1, produces the following results.

| | Concentration of Adduct, lb./1,000 barrels | Average odor rating | |
|---|---|---|---|
| | | Intensity | Irritation |
| Test No.: | | | |
| 1 | 0 | 3.1 | 2.5 |
| 2 | 25 | 1.6 | 1.8 |
| 3 | 50 | 2.3 | 1.8 |
| 4 | 0 | 3.0 | 2.7 |
| 5 | 25 | 2.3 | 1.7 |
| 6 | 50 | 2.3 | 1.2 |

Similar results can be achieved with the substitution of other adducts discussed above for all or a portion of the diacetone acrylamide-butadiene adduct in diesel fuel compositions.

By substituting any of the adducts of Examples 2–25 for that of Example 1 in the tested diesel compositions in concentrations of 25 to 50 pounds/1000 barrels of fuel, other specific fuel compositions are readily prepared.

Of course, it will be apparent that the fuel compositions can contain other conventional additives such as smoke suppressants, corrosion inhibitors, antioxidants, ashless dispersants, demulsifiers, antistatic agents, and the like.

In addition to the foregoing properties, the adducts have a variety of other uses. For example, the liquid adducts can be used as solubilizing agents due to the combination of the relatively polar carbamyl side chain and the relatively nonpolar cyclic ring. Thus, they can be used to promote dispersion of various materials in liquid media, for example, the components of paints in the conventional paint bases, e.g., linseed oil, turpentine, etc. Similarly, the adducts are useful as plasticizers and ultraviolet absorbing additives in polymeric compositions such as polyvinyl chloride compositions. In these latter applications, the adducts are incorporated into the polymeric compositions in amounts of about 0.1%–10% by weight and usually, 0.5% to 5% by weight.

What is claimed is:

1. A fuel composition comprising a major amount of a normally liquid petroleum distillate fuel and an ordor-suppressing amount of a compound selected from the class consisting of (A)

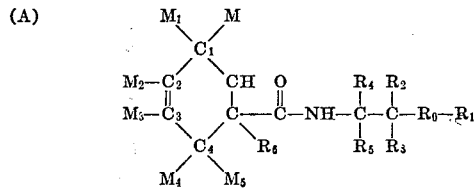

(B)

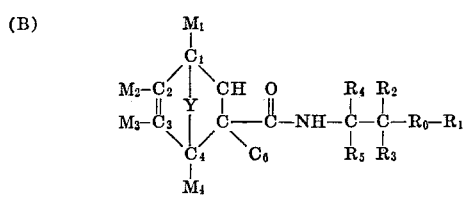

where $M$–$M_5$ are each individually hydrogen or a monovalent radical selected from the group consisting of hydrogen; halo, nitro, cyano, carboxy,

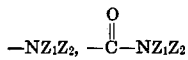

formyl, formyloxy, hydroxy, mercapto, hydrocarbyl, and hydrocarbyl —X— groups where —X— is a divalent radical selected from the group consisting of

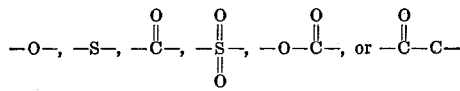

with the proviso that the hydrocarbyl and hydrocarbyl —X— groups may be substituted by one or more of the above enumerated monovalent radicals; $Z_1$ and $Z_2$ are each individually selected from the class consisting of hydrogen, lower alkyl, or together with the nitrogen atom to which they are attached form a five- or six-membered heterocyclic radical; Y is an aliphatic hydrocarbylene group; $R_1$–$R_5$ are each individually hydrogen or hydrocarbyl of up to ten carbon atoms with the proviso that the hydrocarbyl groups can be substituted by one or more of the above enumerated radicals; $R_6$ is hydrogen or lower alkyl, and $R_0$ is

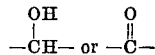

2. A fuel composition to claim 1 where $M$–$M_5$ are each hydrogen or lower alkyl.

3. A fuel composition according to claim 2 where $R_1$–$R_5$ are each individually hydrogen or lower alkyl.

4. A fuel composition according to claim 3 wherein $R_6$ is hydrogen or methyl.

5. A fuel composition according to claim 1 where the compound corresponds to Formula (A) and $R_2$ and $R_3$ are each hydrogen, $R_1$, $R_4$, and $R_5$ are each lower alkyl, and $M$–$M_5$ are hydrogen or lower alkyl.

6. A fuel composition according to claim 5 where $R_1$, $R_4$, $R_5$ are each methyl, $R_6$ is hydrogen, $M$–$M_5$ are each hydrogen, and $R_0$ is

7. A fuel composition according to claim 6 where $R_0$ is

8. A fuel composition according to claim 1 where the fuel is diesel fuel.

9. A fuel composition according to claim 3 where the fuel is diesel fuel.

10. A fuel composition according to claim 5 where the fuel is diesel fuel.

11. A fuel composition according to claim 6 where the fuel is diesel fuel.

References Cited

UNITED STATES PATENTS

| | | | |
|---|---|---|---|
| 3,247,200 | 4/1966 | Ugi et al. | 260—557 |
| 3,277,056 | 10/1966 | Coleman | 252—51.5A |
| 3,341,455 | 9/1967 | Coleman | 44—62 |

DANIEL E. WYMAN, Primary Examiner

Y. H. SMITH, Assistant Examiner

U.S. Cl. X.R.

44—71, 74, 75

UNITED STATES PATENT OFFICE
CERTIFICATE OF CORRECTION

Patent No. 3,549,340　　　　　　　　　Dated December 22, 1970

Inventor(s) Lester E. Coleman

It is certified that error appears in the above-identified patent and that said Letters Patent are hereby corrected as shown below:

Column 13, line 6, that is, Claim 1, line 2, "ordor-" should be --odor- --; the divalent radical appearing at the end of line 36 as "$-\overset{\text{O}}{\underset{\|}{C}}-C-$" should be -- $-\overset{\text{O}}{\underset{\|}{C}}-O-$ --.

The language --according-- should be inserted after "composition" in column 14, line 5, that is, Claim 2, line 1.

Signed and sealed this 20th day of July 1971.

(SEAL)
Attest:

EDWARD M. FLETCHER, JR.　　　　　WILLIAM E. SCHUYLER, JR.
Attesting Officer　　　　　　　　　Commissioner of Patents